(12) United States Patent
Ramun et al.

(10) Patent No.: US 7,354,010 B2
(45) Date of Patent: Apr. 8, 2008

(54) SINGLE JAW SET MULTIPLE TOOL ATTACHMENT SYSTEM

(75) Inventors: John R. Ramun, 8243 N. Lima Rd., Poland, OH (US) 44514; Marc A. Cossette, Poland, OH (US)

(73) Assignee: John R. Ramun, Poland, OH (US)

( * ) Notice: Subject to any disclaimer, the term of this patent is extended or adjusted under 35 U.S.C. 154(b) by 177 days.

(21) Appl. No.: 10/533,862

(22) PCT Filed: Nov. 12, 2003

(86) PCT No.: PCT/US03/36104

§ 371 (c)(1),
(2), (4) Date: Nov. 17, 2005

(87) PCT Pub. No.: WO2004/044349

PCT Pub. Date: May 27, 2004

(65) Prior Publication Data

US 2006/0131454 A1  Jun. 22, 2006

(51) Int. Cl.
*B02C 9/04* (2006.01)

(52) U.S. Cl. ............... 241/101.73; 241/266; 30/134

(58) Field of Classification Search ........... 241/101.73, 241/266; 30/134
See application file for complete search history.

(56) References Cited

U.S. PATENT DOCUMENTS

| | | | |
|---|---|---|---|
| 4,670,983 A | 6/1987 | Ramun | |
| 5,044,569 A | 9/1991 | LaBounty et al. | |
| 5,060,378 A | 10/1991 | LaBounty et al. | |
| RE35,432 E | 1/1997 | LaBounty et al. | |
| 5,926,958 A | 7/1999 | Ramun | |
| 5,940,971 A | 8/1999 | Ramun | |
| 6,061,911 A | 5/2000 | LaBounty et al. | |
| 6,202,308 B1 | 3/2001 | Ramun | |
| 2007/0001041 A1* | 1/2007 | Christenson | 241/101.73 |

FOREIGN PATENT DOCUMENTS

WO    WO 01/68992 A1    9/2001

* cited by examiner

*Primary Examiner*—Faye Francis
(74) *Attorney, Agent, or Firm*—The Webb Law Firm

(57) ABSTRACT

A multiple tool attachment system (10) for demolition equipment includes an adapter (12) and a universal body (18) coupled to the adapter with a pair of pivotable jaws (22) pivotally attached to the universal body. Each of the jaws includes a tool carrier for mounting one of a selective set of tool attachments. Each tool attachment forms a distinct tool for the system. The tools can include, but are not limited to a cracker, a pulverizer, a wood shear, an iron/rail cracker and a grapple.

35 Claims, 13 Drawing Sheets

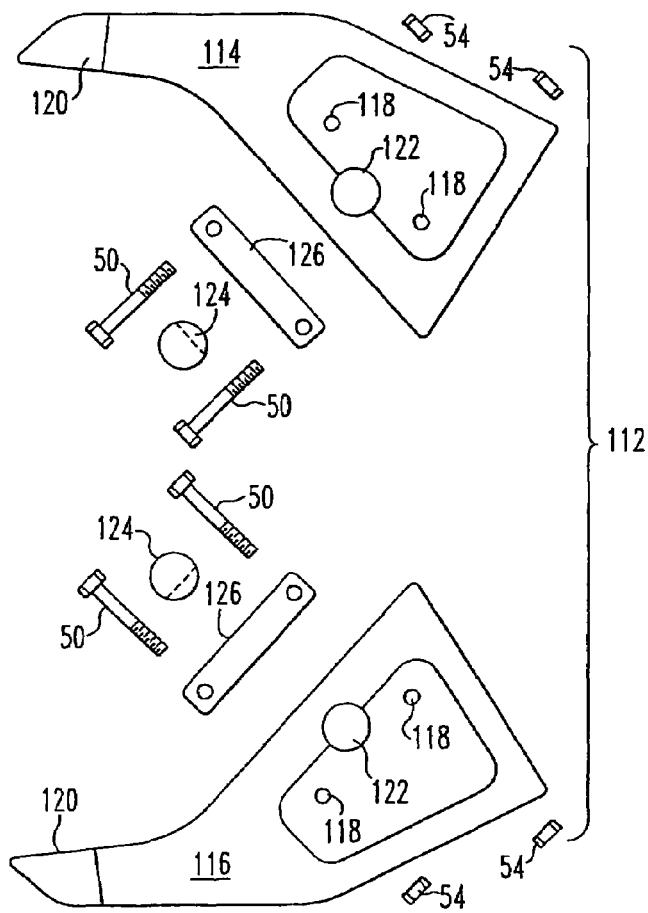
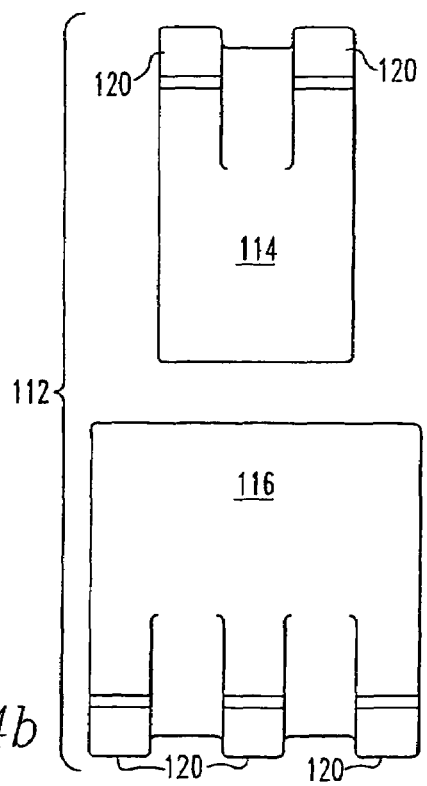
FIG.14a
FIG.14b

SINGLE JAW SET MULTIPLE TOOL ATTACHMENT SYSTEM

BACKGROUND OF THE INVENTION

1. Field of the Invention

The present invention relates to a tool attachment system for construction or demolition equipment which is adapted to be attached to a backhoe for attaching multiple tools, such as a cracker attachment, a pulverizing attachment, a wood shear attachment, an iron/rail cracker attachment, a grapple attachment or the like. More particularly, the present invention relates to a single jaw set multiple tool attachment system in which the single jaw set includes a pair of movable jaws.

2. Background Information

The present application refers to demolition equipment; however, the equipment is also referred to as construction equipment, scrap handling equipment and the like. The description of demolition equipment, scrap handling equipment or construction equipment is not intended to be restrictive of the equipment being referenced. Demolition equipment, such as heavy-duty metal cutting shears, grapples and concrete crushers, have been mounted on backhoes powered by hydraulic cylinders for a variety of jobs in the demolition field. This equipment provides for the efficient cutting and handling of scrap.

In the dismantling of an industrial building, metal scrap in the form of various diameter pipes, structural I-beams, channels, angles, sheet metal plates and the like, must be efficiently severed and handled by heavy-duty metal shears. Such metal shears can also be utilized for reducing automobiles, truck frames, railroad cars and the like. The shears must be able to move and cut the metal scrap pieces regardless of the size or shape of the individual scrap pieces and without any significant damage to the shears. In demolition of an industrial building, concrete crackers are also used to reduce the structure to manageable components, which can be easily handled and removed from the site. Wood shears and plate shears also represent specialized cutting devices, which are useful in particular demolition or debris removal situations, depending on the type of scrap. Further, a grapple is often utilized where handling of debris or work pieces is a primary function of the equipment. Historically, all of these pieces of equipment represent distinct tools having significant independent capital cost. Consequently, the demolition industry has tended to develop one type of tool associated with each body.

U.S. Reissue Pat. No. 35,432 and U.S. Pat. No. 5,060,378 disclose heavy-duty metal cutting shears having a pair of movable jaws. U.S. Pat. No. 5,359,775 further discloses a metal cutting shear with a pair of movable jaws pivotally mounted to a frame and operable off of a common piston. U.S. Pat. Nos. 4,838,493; 4,980,798; 5,044,569; 5,636,802; and 5,738,289 all disclose a variety of concrete crushers having a plurality of movable jaws and operable through hydraulic cylinders. U.S. Pat. Nos. 4,903,408; 5,044,568; 5,199,658; 5,243,761; and 5,626,301 also disclose a variety of demolition equipment having a plurality of movable jaws.

The prior art does not provide a system for easily changing tools or a system which allows separate tools to efficiently share a common structure.

SUMMARY OF THE INVENTION

An object of the present invention is to overcome the aforementioned drawbacks of the prior art. It is an object of the present invention to provide a single jaw set multiple tool attachment system, which is easily converted between a plurality of distinct tools. A further object of the present invention is to provide a demolition tool having a plurality of movable jaws, which optimizes the jaw structure and provides a quick release for the jaw structure.

The single jaw set multiple tool attachment system according to the present invention achieves the above-identified objects. The system of the present invention is attached to demolition equipment, also referred to as construction equipment, scrap handling equipment and the like. The system includes a pair of jaws configured to couple to the demolition equipment. At least one of the jaws is pivotable. A plurality of tool attachments is selectively attachable to each of the pair of jaws for forming distinct tool units.

The system may also include an adapter for coupling the system to the demolition equipment. A body couples to the adapter. The pair of jaws then couples to the body.

Furthermore, the system may include a plurality of fasteners. In such case, each tool carrier includes at least one fastener hole, and each of the plurality of tool attachments includes at least one attachment hole. The fasteners couple the tool attachments to the tool carriers via the fastener holes and the attachment holes.

The tool attachments of the present invention can include a cracker attachment, including various combinations of single rake and double rake teeth; a pulverizing attachment; a wood shear attachment; an iron/rail cracker attachment; and a grapple attachment.

These and other advantages of the present invention will be clarified in the description of the preferred embodiments where like reference numerals represent like elements throughout.

BRIEF DESCRIPTION OF THE DRAWINGS

FIG. 8b is an end view of the wood shear attachment of FIG. 8a;

FIG. 9 is an elevational side view of the system of FIG. 1 with the wood shear attachment of FIG. 8a;

FIG. 10b is an end view of the iron/rail cracker attachment shown in FIG. 10a;

FIG. 11 is an elevational side view of the system of FIG. 1 with the iron/rail cracker of FIG. 10a;

FIG. 14*a* is an exploded side view of an alternative grapple attachment for the multiple tool attachment system of FIG. 1;

FIG. 14*b* is an end view of the alternative grapple attachment illustrated in FIG. 14*a*.

DESCRIPTION OF THE PREFERRED EMBODIMENTS

Figure 1:
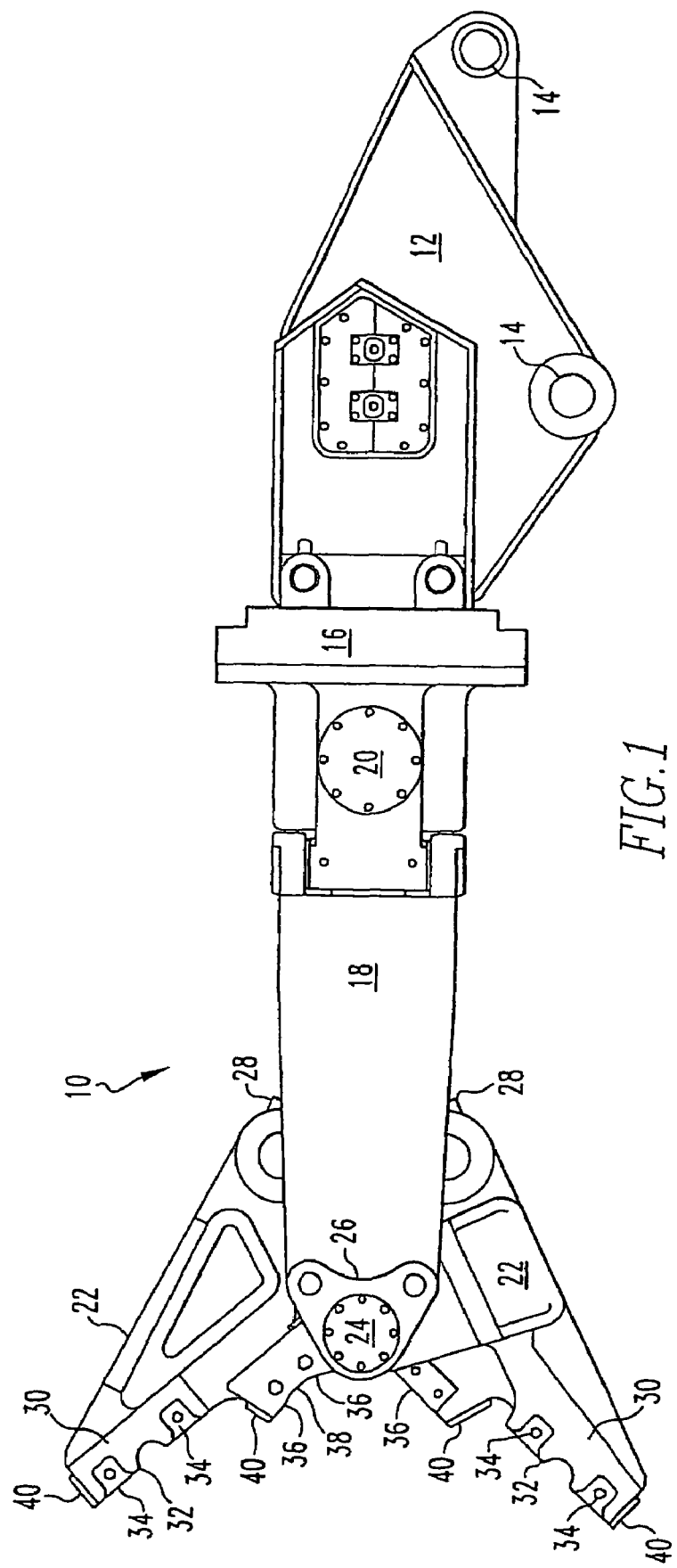
FIG. 1 is an elevational side view of a single jaw set multiple tool attachment system, according the the present invention.

FIG. 1 illustrates a multiple tool attachment system 10 according to the present invention and adapted to be attached to demolition equipment, such as a backhoe (not shown). The system 10 is adapted to connect one of a series of distinct tools as described hereinafter.

The system 10 of the present invention includes an adapter 12 for attaching the system 10 to the demolition equipment in a conventional fashion. The adapter 12 pivotally connects the system 10 to the demolition equipment and to a controlling piston for pivoting the system 10 through mounting lugs 14. The adapter 12 is intended to conform to the specific demolition equipment such that the shape of the adapter 12 and position of lugs 14 will differ, depending on the specific demolition equipment utilized.

FIG. 1 illustrates a rotational joint 16 adjacent to the adapter 12. A universal body 18 is attached to the rotational joint 16. The rotational joint 16 allows for 360-degree rotation of the universal body 18. However, it is anticipated that the system 10 can be constructed without rotation, thereby omitting the rotational joint 16, if desired.

The universal body 18 houses a double-acting hydraulic cylinder pivotally attached to the universal body 18 through a trunnion 20.

The system 10 additionally includes a jaw set formed by a pair of jaws 22 pivotally mounted to the universal body 18, essentially at hub or pivot 24. A bridge housing 26 surrounds the pivot 24 and is provided for a quick change of the jaws 22. Each of the jaws 22 is pivotally moved about the pivot 24 by the hydraulic cylinder through a pair of linkage arms 28.

The structure of the universal body 18 of the system 10 is described in greater detail in Applicants' International Patent Application PCT/US00/28367 (hereinafter "the PCT application"). The PCT patent application describes in detail the preferred construction for the rotational joint 16, universal body 18, trunnion 20, cylinder mounting, jaws 22, pivot 24, quick release bridge 26 and linkage arms 28. The PCT application additionally illustrates the various modifications to these designs, which are believed to be encompassed within the scope of the present invention. Applicants' prior invention provides a multiple tool attachment system which utilizes the universal body 18 and a plurality of distinct easily changeable jaws sets. Whereas, the present invention maximizes the versatility of the single jaw set formed by jaws 22 and provides a single jaw set multiple tool attachment system 10 providing a plurality of distinct tool sets utilizing the single jaw set. In other words, the invention described in the PCT application included specific jaw sets having a primary function as a shear, a cracker, a grapple or the like. The specialized jaw sets were easily swapped into and out of the universal body. The present invention provides a non-specialized or universal jaw set, which can form a variety of distinct tools. The universal jaw set of the present invention is intended to compliment the specialized jaw sets of the PCT application and not replace them.

Each jaw 22 of the present invention includes a tool carrier 30 adapted to receive a plurality of distinct tool attachments as described hereinafter. Each tool carrier 30 includes a mounting surface 32 and securing bolt holes 34. The jaws 22 additionally include a shearing portion near the throat (i.e., adjacent the pivot 24). The shearing portion includes cutting inserts or blades 36 bolted in the respective jaws 22. As illustrated, one of the jaws 22 may additionally include a pair of cutting inserts 36 forming an apex 38, which assists in pulling the material towards the throat for cutting. Adjacent the shearing portion, each jaw 22 includes wear plates 40. Wear plates 40 are also at the end of each jaw 22.

Figure 2:
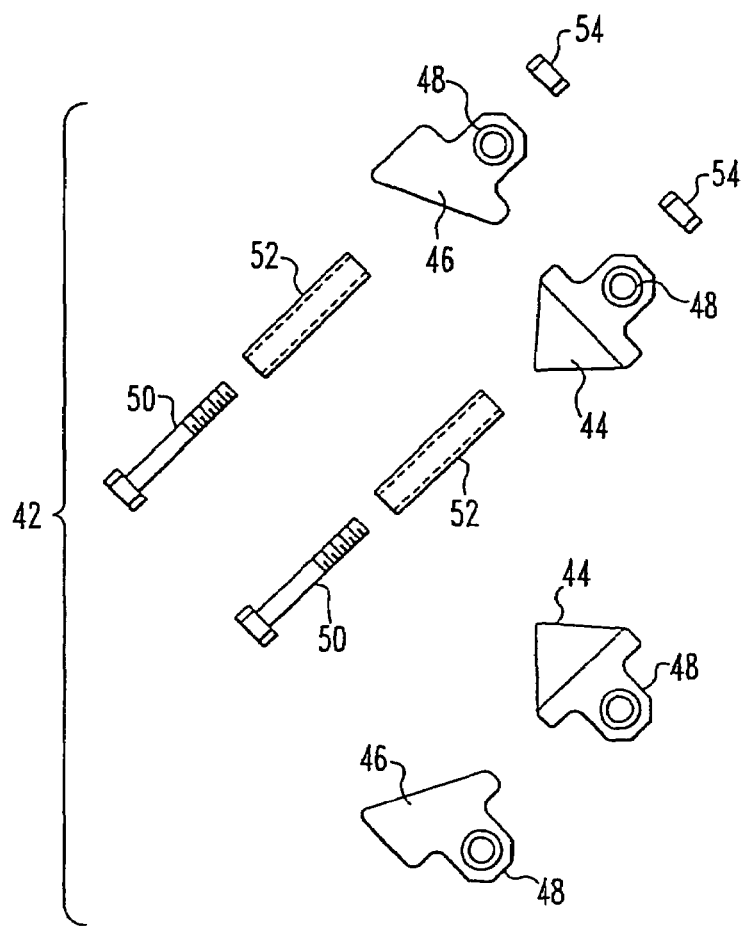
FIG. 2 is an exploded side view of a cracker attachment for the multiple tool attachment system illustrated in FIG. 1.
Figure 4:
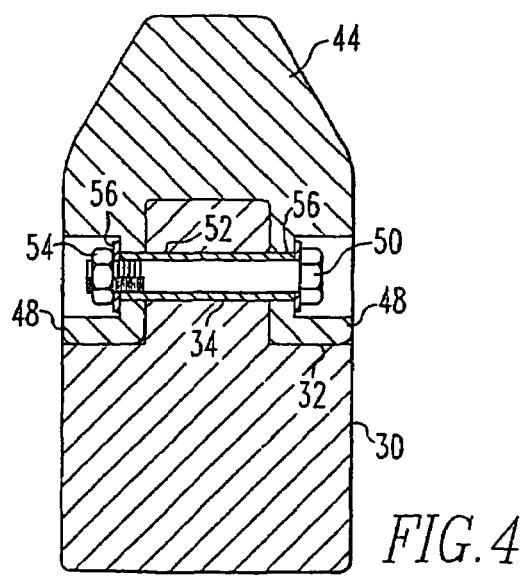
FIG. 4 is a sectional view of a jaw of the system of FIG. 3.
Figure 3:
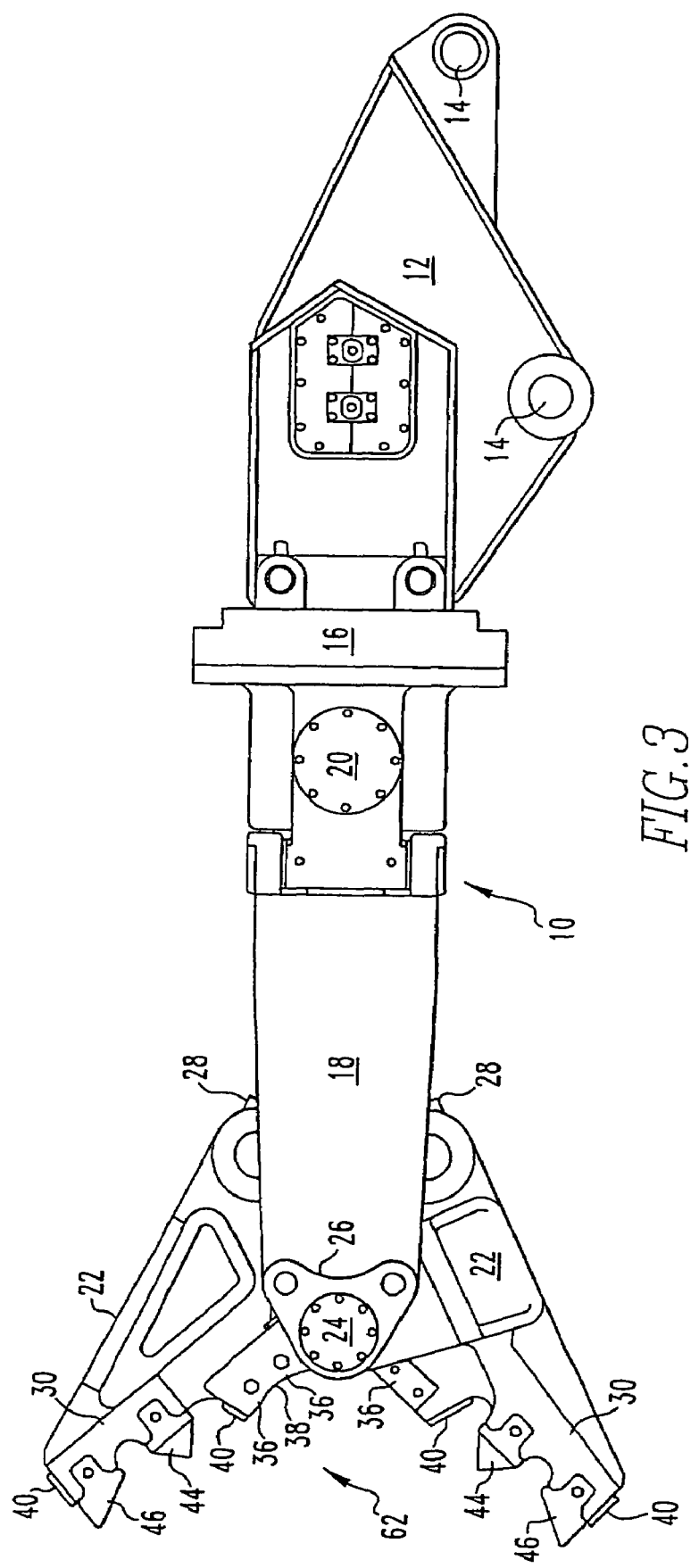
FIG. 3 is an elevational side view of the system of FIG. 1 with the cracker attachment of FIG. 2.

The system 10 of the present invention is adapted for receiving multiple tool attachments on the tool carriers 30 of the jaws 22. FIG. 2 illustrates a cracker attachment 42, formed of a combination of double rake teeth 44 and single rake teeth 46, which are attachable to the tool carrier 30. The cracker attachment may include a double rake tooth 44, a single rake tooth 46, or any combination of double and single rake teeth. The teeth 44 and 46 are adapted to engage with portions of the mounting surface 32. The teeth 44 and 46 additionally include attachment lugs 48 which align with bolt holes 34 when the teeth 44 and 46 engage the mounting surface 32. Bolt 50 extends through retaining sleeve 52, attachment lugs 48 and bolt hole 34, to secure the respective teeth 44 and 46 to a tool carrier 30 of a jaw 22 as best illustrated in FIG. 4. Retaining nut 54 will hold the bolt 50 in position. Lock washers 56 can also be provided as illustrated in FIG. 4. It should be noted that FIG. 2 only illustrates the bolts 50, sleeves 52 and nuts 54 for two of the four teeth 44 and 46; however, the bolts 50 are utilized for retaining all of the teeth 44 and 46. It should be appreciated that many modifications for the attachment of the teeth 44 and 46 of the cracker attachment 42 can be contemplated within the scope of the present invention. Some of these modifications may require corresponding changes to the tool carrier 30.

Figure 5:
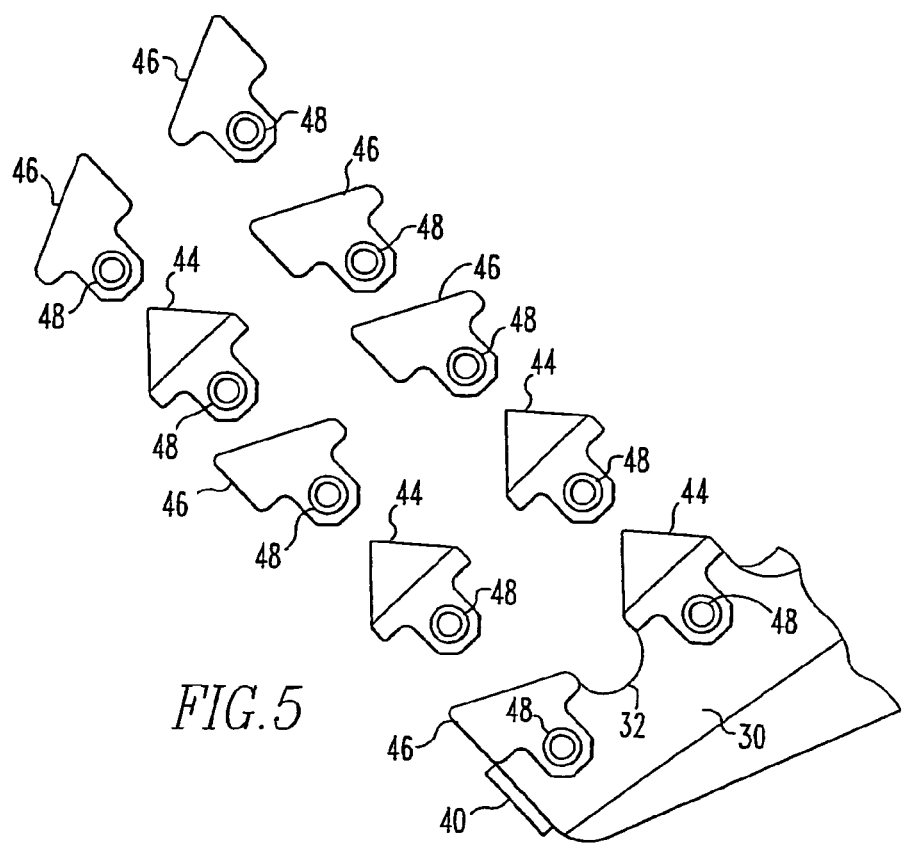
FIG. 5 illustrates a variety of alternative cracker attachment teeth arrangements.

FIG. 5 illustrates some of the different combinations available for arranging the teeth 44 and 46 on each jaw 22 for forming the cracker attachment 42. Therefore, the cracker attachment 42 does have some individual versatility based upon the placement of the individual teeth 44 and 46. The cracker attachment 42 is useful for handling rock, concrete, aggregate, castings and the like.

Figure 6:
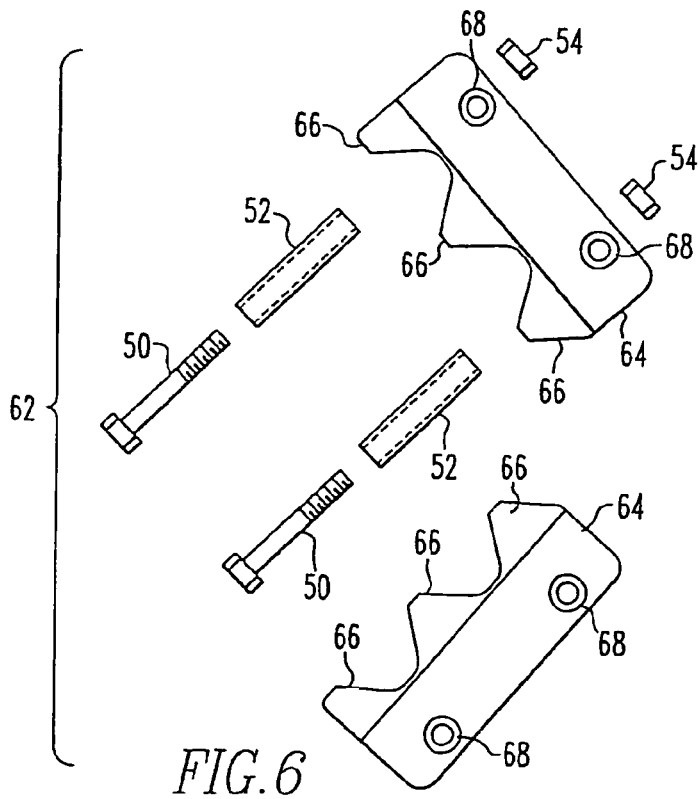
FIG. 6 is an exploded side view of a pulverizing attachment for the multiple tool attachment system of FIG. 1.
Figure 7:
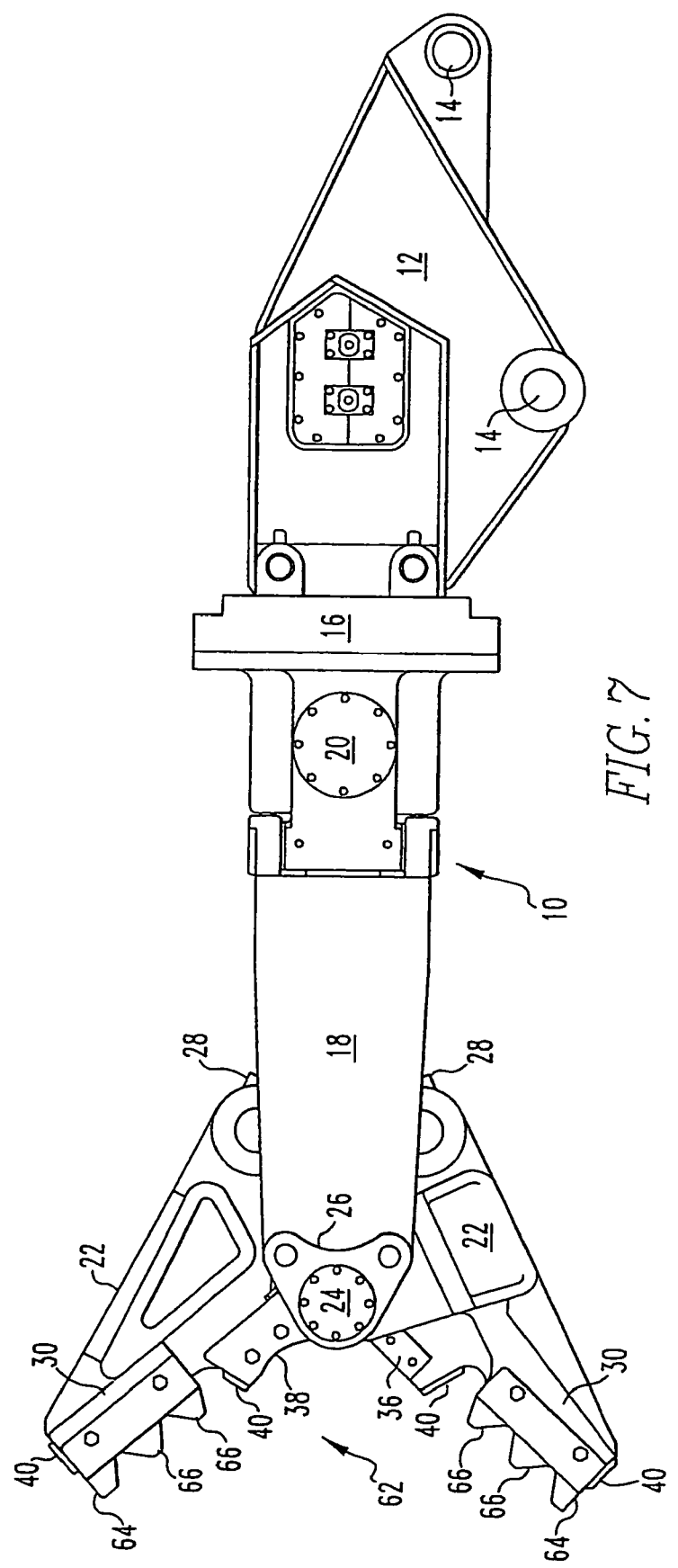
FIG. 7 is an elevational side view of the system of FIG. 1 with the pulverizing attachment of FIG. 6.

FIG. 6 illustrates a pulverizing attachment 62 for the multiple tool attachment system 10 of FIG. 1. The pulverizing attachment 62 includes a pair of inserts 64 having integral teeth 66 for pulverizing concrete or the like. The pulverizing attachment also includes attachment lugs 68 that align with the bolt holes 34 for coupling the inserts 64 with the respective jaws 22 through use of the bolts 50, sleeves 52 and nuts 54. FIG. 7 illustrates the system 10 with the pulverizing attachment 62 positioned on the jaws 22.

Figure 8A:
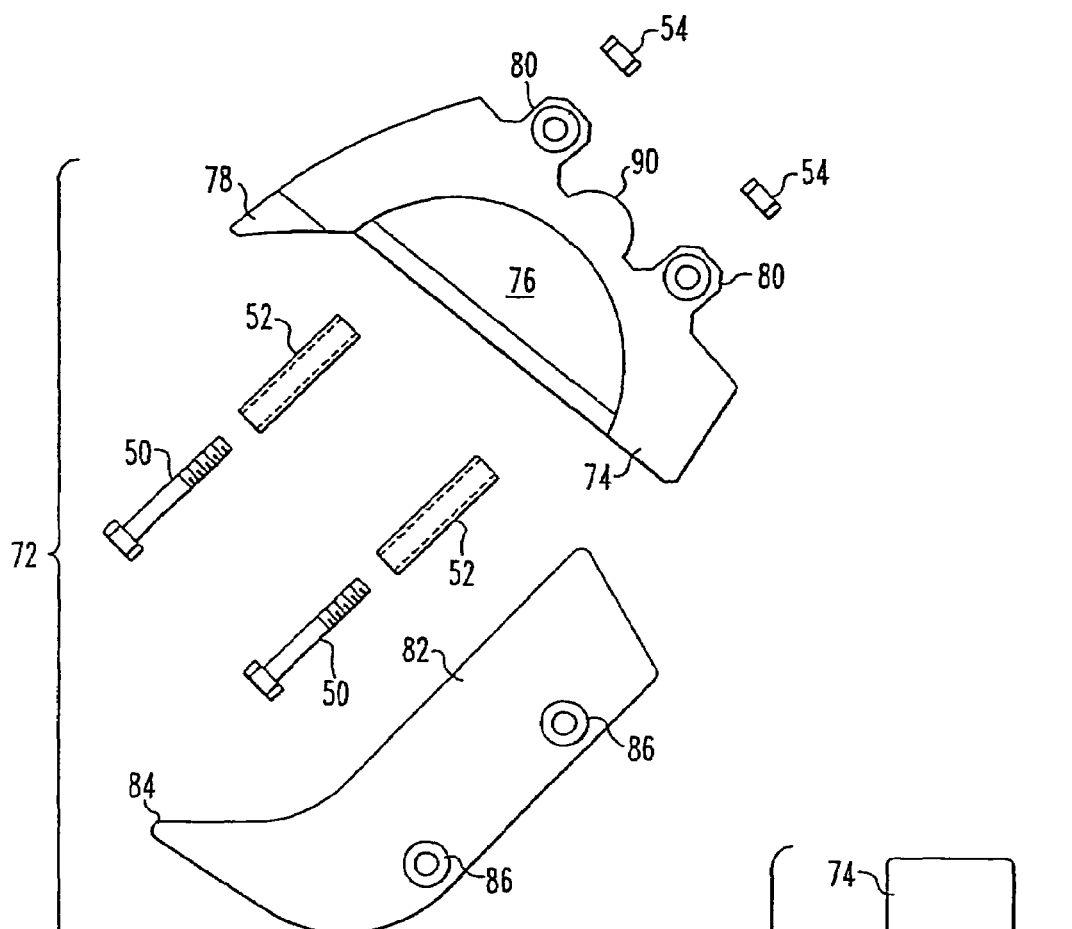
FIG. 8a is an exploded side view of a wood shear attachment for the multiple tool attachment system of FIG. 1.
Figure 8B:
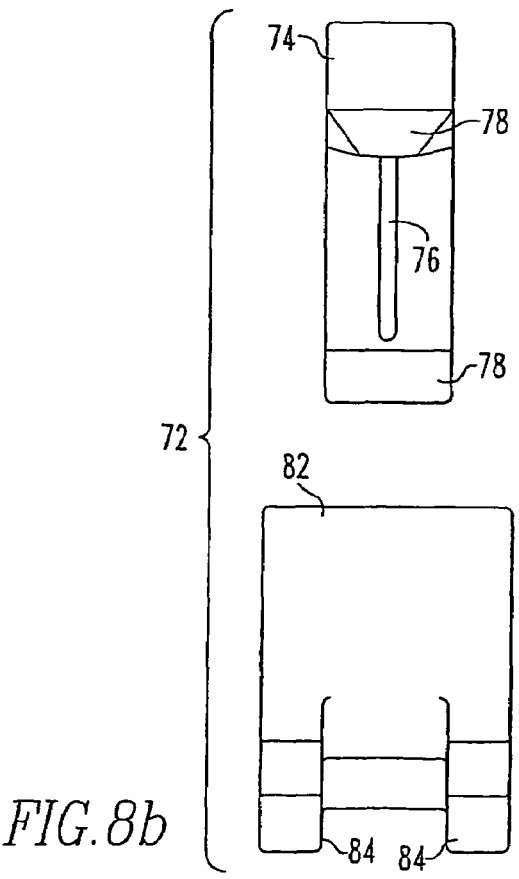
Figure 9:
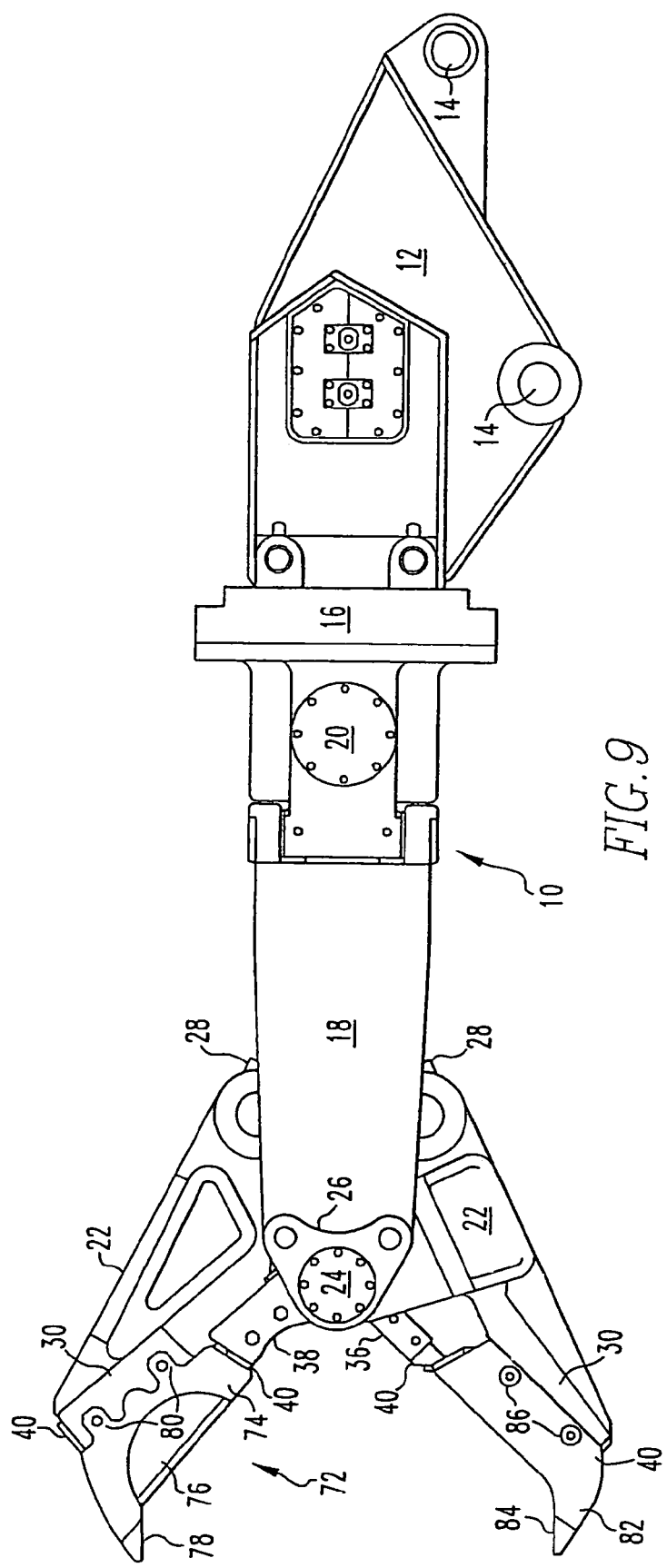

FIGS. 8*a*, 8*b* and 9 illustrate a wood shear attachment 72 for the system 10 of the present invention. The wood shear attachment 72 includes a blade insert 74 with blade 76, piercing tip 78 and attachment lugs 80. Additionally, the wood shear attachment 72 includes an anvil insert 82 with spaced tines 84 and attachment lugs 86. The attachment lugs 80 and 86 are aligned with the bolt holes 34 when the wood shear attachment 72 is coupled to the system 10. The blade insert 74 and anvil insert 82 are coupled to the jaws 22 through the bolts 50, sleeves 52, and nuts 54, in the same manner as insert 64. Further, the blade insert 74 additionally includes an engaging projection 90, engaging a corresponding recess on the mounting surface 32, providing further securement between the blade insert 74 and the jaw 22. This construction, using the engaging or locking projection, can be utilized for insert 64 and anvil insert 82, if desired. The wood shear attachment 72 has application for working with trees, stumps, telephone poles and the like. FIG. 9 illustrates the system 10 with the wood shear attachment 72.

Figure 10A:
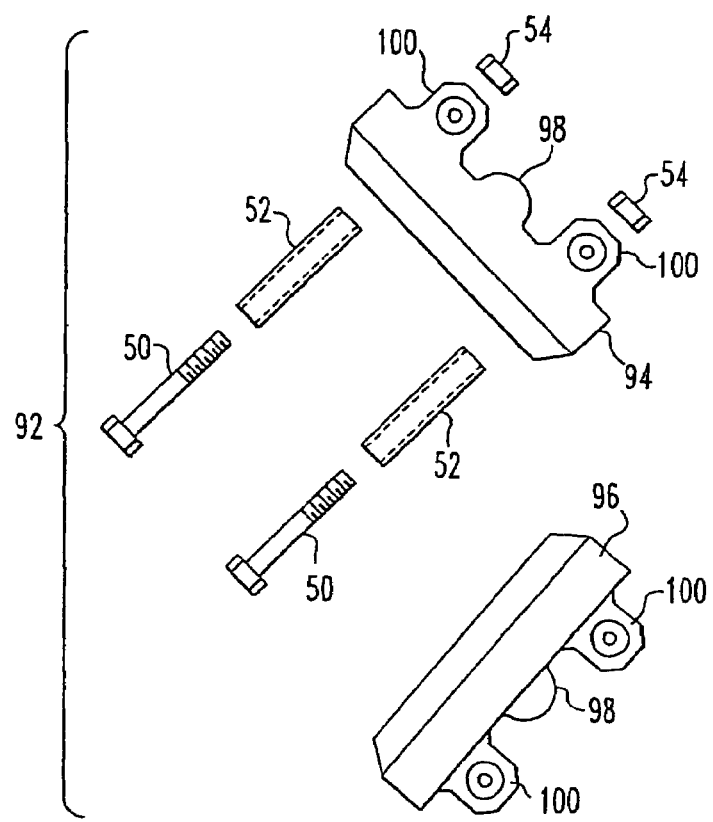
FIG. 10a is an exploded side view of an iron/rail cracker attachment for the multiple tool attachment system of FIG. 1.
Figure 10B:
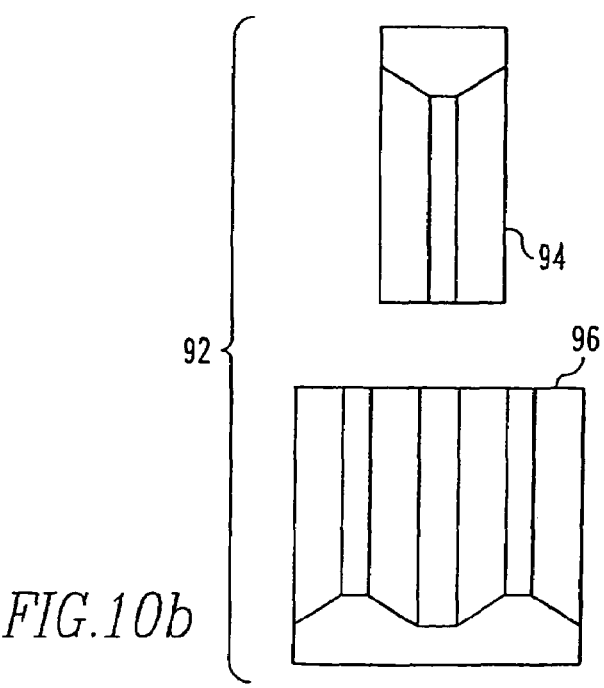
Figure 11:
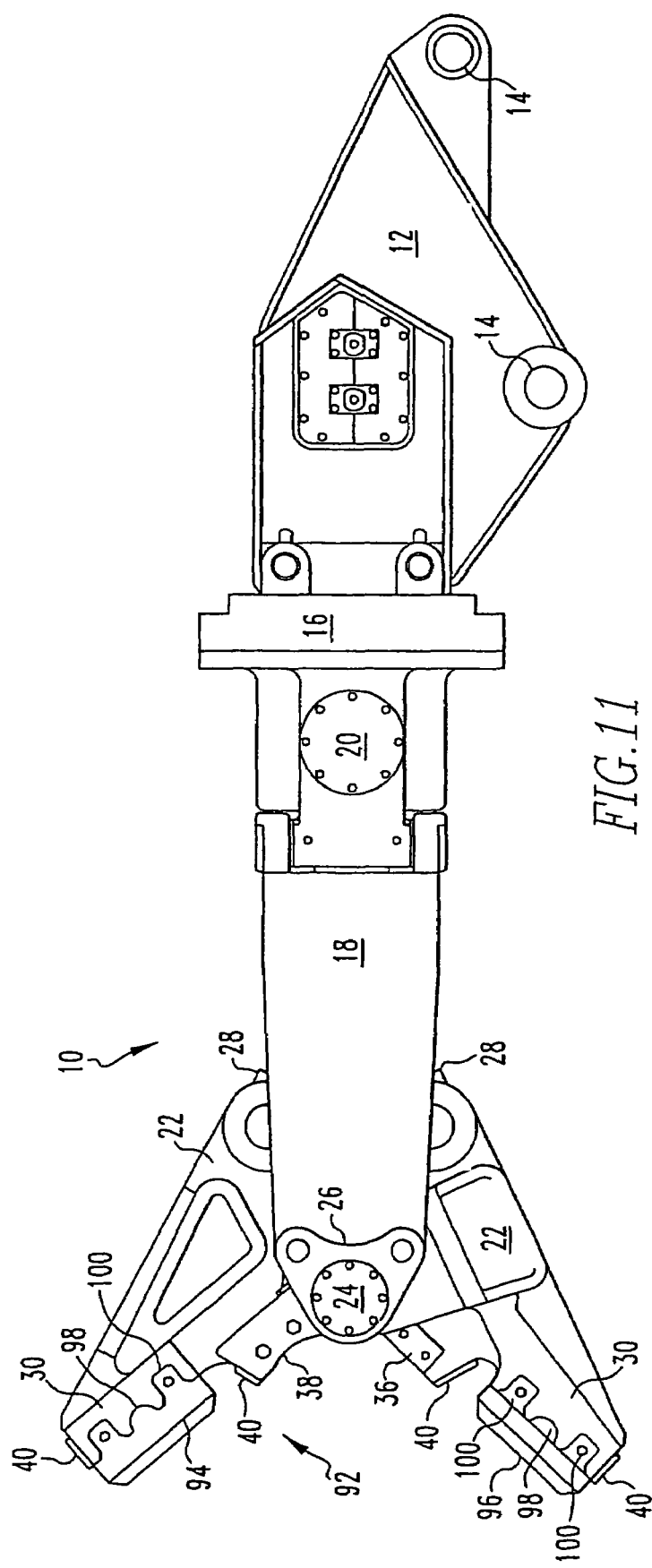

FIGS. 10a and 10b illustrate an iron/rail cracker attachment 92 for the system 10 of the present invention. The iron/rail cracker attachment 92, include cracker inserts 94 and 96, with associated projection 98 and attachment lugs 100, for securing to the respective jaws 22, through use of the bolts 50, sleeves 52, and nuts 54. The cracker insert 94 is illustrated as a single cracker attachment and the cracker insert 96 is illustrated as a double cracker attachment, as shown in FIG. 10b. The iron/rail cracker attachment 92 is illustrated attached to the system 10 in FIG. 11 and is useful for iron and rail products, as well as cracking castings, engine blocks and the like.

Figure 12B:
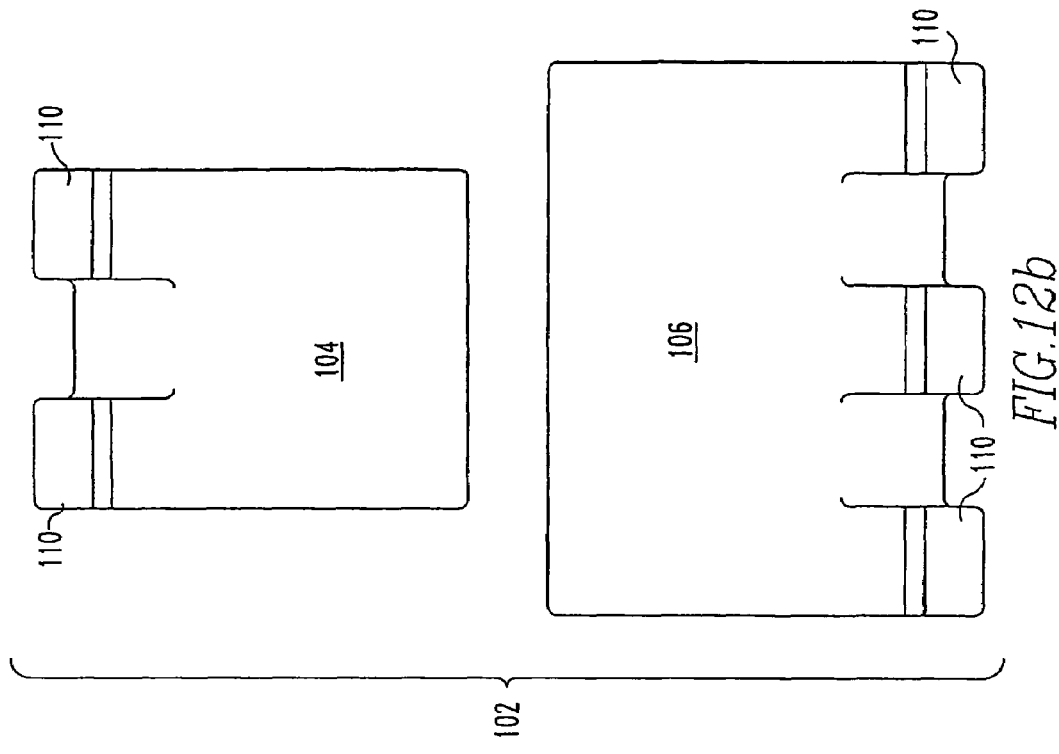
FIG. 12*b* is an end view of the grapple attachment illustrated in FIG. 12*a*.
Figure 12A:
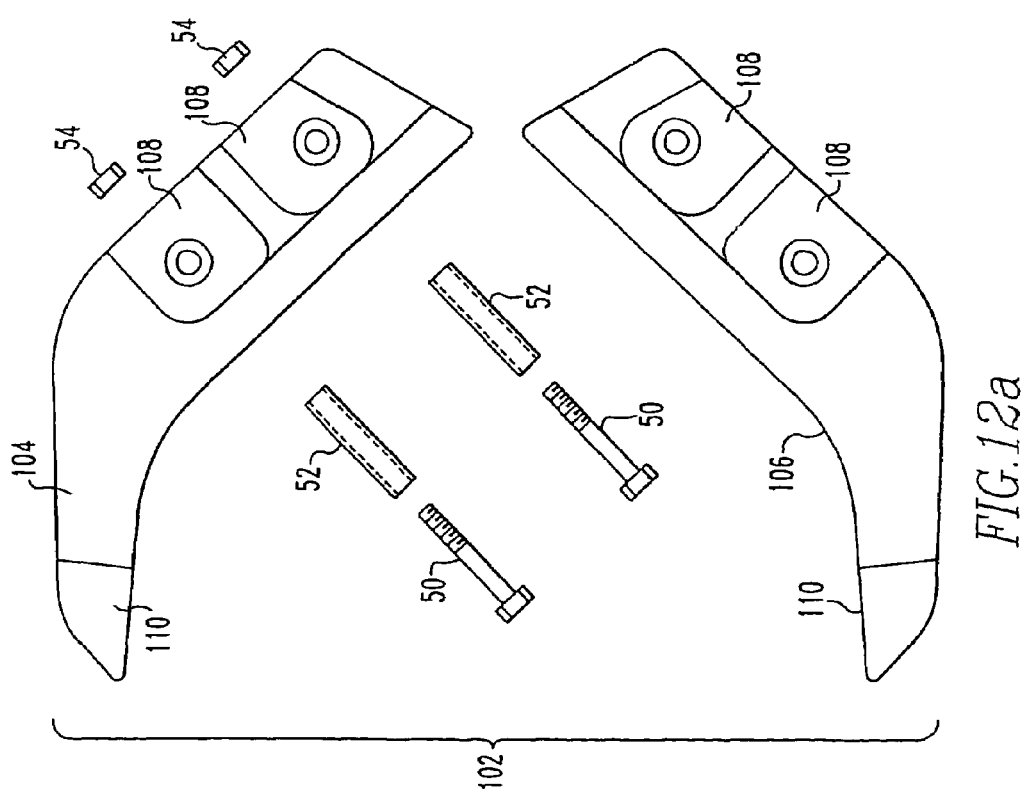
FIG. 12*a* is an exploded side view of a grapple attachment for the multiple tool attachment system of FIG. 1.
Figure 13:
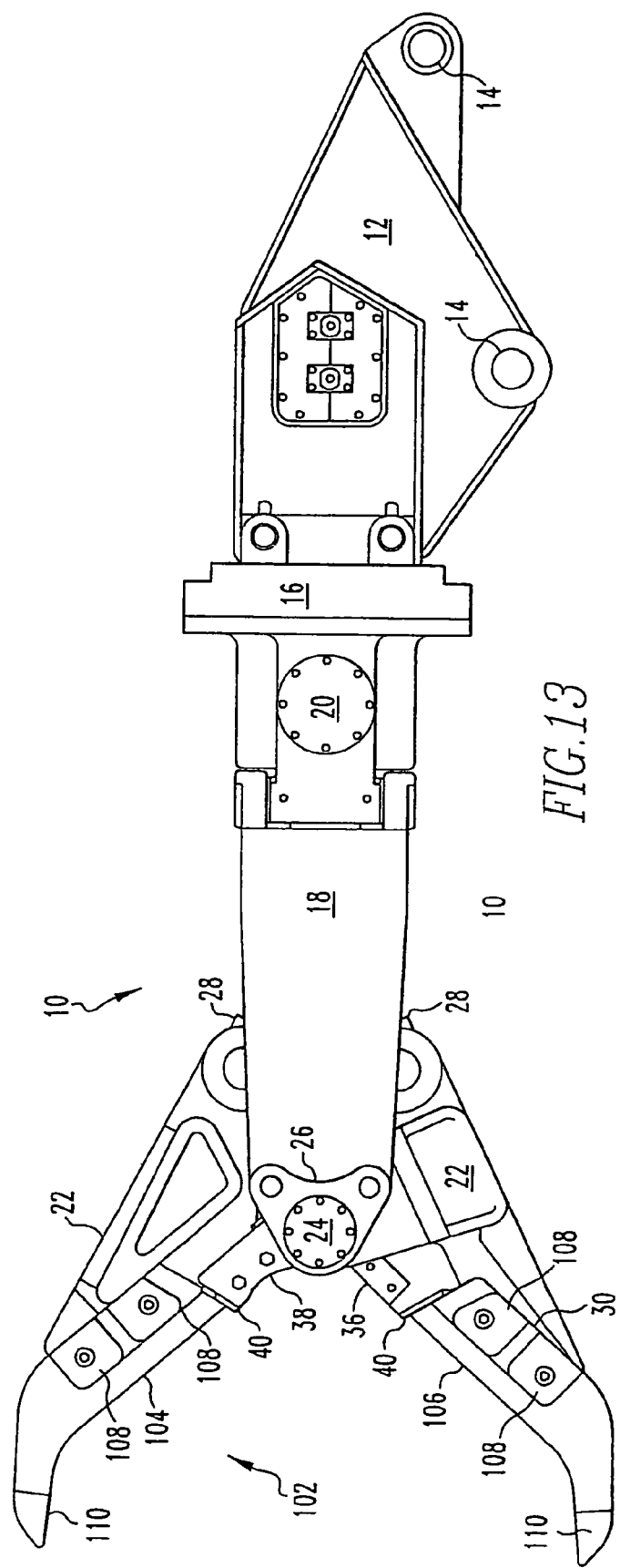
FIG. 13 is an elevational side view of the multiple tool attachment system of FIG. 1 with the grapple attachment of FIG. 12*a*.

FIGS. 12a and 12b illustrate a grapple attachment 102, having a pair of grapple inserts 104 and 106 with associated attachment lugs 108. The lugs 108 align with the bolt holes 34 and are secured to the tool carrier 30 with the bolts 50, sleeves 52 and nuts 54. The grapple inserts 104 and 106 have offset tines 110, as best illustrated in FIG. 12b. Although, if desired, the offset tines 110 can be aligned to form more of a scoop arrangement, depending on the intended debris or work product. FIG. 13 illustrates the system 10 with grapple attachment 102 coupled therewith. A grapple is typically utilized for gripping, loading, unloading, sizing and sorting debris.

FIGS. 1 to 13 illustrate several aspects of the system 10 of the present invention, in which a single jaw set can be utilized to form a concrete cracker with cracker attachment 42, a concrete pulverizing tool with pulverizing attachment 62, a wood cutting shear with wood shear attachment 72, an iron/rail cracker with iron/rail cracker attachment 92, or grapple with grapple attachment 102. All of these distinct tools are provided from a single jaw set formed by jaws 22. Further, the changing of the various tools merely requires releasing of the bolts 50, replacing the attached inserts with the inserts of the desired attachment, and finally replacing the bolts 50. In this manner, a single jaw set can be utilized to form a wide variety of distinct tools.

Figure 15:
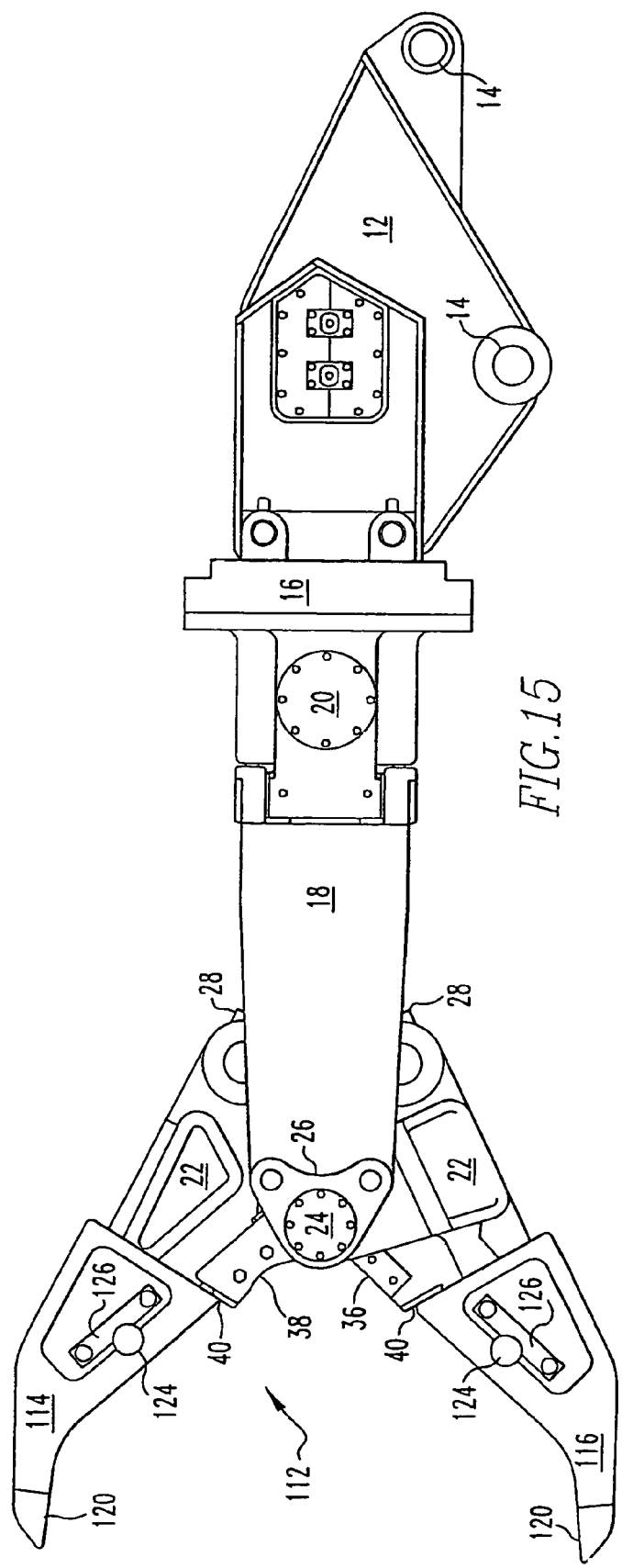
FIG. 15 is an elevational side view of the system of FIG. 1 with the grapple attachment of FIG. 14*a*.

As discussed above, modifications may be made to the particular attachment arrangement, as shown, for example, in the alternative grapple attachment 112, illustrated in FIGS. 14a and 14b. Grapple attachment 112 is similar to grapple attachment 102, in that it includes a pair of grapple inserts 114 and 116, with attachment holes 118 extending there through aligning with the bolt holes 34. Further, the grapple attachment 112 includes plurality of offset tines 120, similar to tines 110 discussed above. The difference with grappling attachment 112 is that each of the inserts 114 and 116 is formed with an internal cavity to cup or extend over the ends of the respective jaws 22, as shown in FIG. 15. In addition, the inserts 114 and 116 include a circular opening 122 receiving a retaining pin 124. The retaining pin 124 includes a slot adapted to receive a retaining bar 126, which is held in place by the bolts 50 and the nuts 54. Consequently, when coupled to the jaws 22, each insert 114 and 116 is held in position by the bolts 50 as well as the retaining pin 124 engaging with the recess in the mounting surface 32. The grapple attachment 112 is intended to show one alternative attachment system utilizing the existing tool carrier 30.

It should be understood by those of ordinary skill in the art that a wide variety of arrangements could be designed for attaching the various tool attachments to the single jaw set. Many of these attachments can utilize the existing tool carrier 30 or may include further modifications to the tool carrier 30 to accommodate the desired attachment. Further, other attachments are possible other than the specific tool sets disclosed.

The present invention provides a system for easily changing demolition tools. The system allows separate tools to efficiently share a common structure. This construction has the advantage of permitting quick change-overs from one type of tool to another at a work site. Furthermore, less equipment is necessary since only the tool attachment changes; the "base" of the demolition equipment stays the same.

The present described embodiments are merely intended to be illustrative of the present invention and not restrictive thereof. It would be apparent to those of ordinary skill in the art that various modifications may be made to the present invention without departing from the spirit and scope thereof.

The invention claimed is:

1. A multiple tool attachment system for demolition equipment comprising:
    an adapter for coupling the system to existing demolition equipment;
    a body coupled to the adapter;
    a pair of jaws coupled to the body, at least one of the jaws being pivotable, and each jaw having a tool carrier extending to the end of each jaw;
    a plurality of tool attachments selectively attachable to each tool carrier for forming distinct tool units;
    wherein each tool carrier includes a mounting surface adapted to receive one of the plurality of tool attachments that is secured to the mounting surface; and
    wherein each tool attachment is adapted to be secured to the mounting surface of the tool carrier through at least one pair of opposing attachment lugs which engage and are secured within a matching opposing pair of attachment lug retention slots.

2. The multiple tool attachment system according to claim 1, wherein the pair of opposing attachment lug retention slots are on the at least one tool attachment and the attachment lugs are on the tool carrier.

3. The multiple tool attachment system according to claim 1, wherein the pair of opposing attachment lug retention slots are on the tool carrier and the attachment lugs are on the at least one tool attachment.

4. The multiple tool attachment system according to claim 3,
    wherein the at least one pair of opposing attachment lug retention slots are separated by a central portion and a fastener hole extends through the central portion to connect each pair of opposing attachment lug retention slots; and
    wherein each pair of opposing attachment lugs has a fastener hole extending therethrough such that when each pair of opposing attachment lugs is engaged within the respective pair of attachment lug retention slots, a fastener may extend through the fastener hole to secure the attachment lugs within the attachment lug retention slots thereby securing the tool attachment to the tool carrier.

5. The multiple tool attachment system according to claim 4, further including a stabilizing groove within the mounting surface between pairs of attachment lug retention slots to receive an engaging projection from the tool attachment.

6. The multiple tool attachment system according to claim 1, wherein one of the plurality of tool attachments is a cracker attachment.

7. The multiple tool attachment system according to claim 6, wherein the cracker attachment includes at least one double rake tooth.

8. The multiple tool attachment system according to claim 7, wherein the cracker attachment includes at least one single rake tooth.

9. The multiple tool attachment system according to claim 6, wherein the cracker attachment includes at least one single rake tooth.

10. The multiple tool attachment system according to claim 1, wherein one of the plurality of tool attachments is a pulverizing attachment.

11. The multiple tool attachment system according to claim 10, wherein the pulverizing attachment includes a pair of inserts, each insert including a plurality of teeth.

12. The multiple tool attachment system according to claim 1, wherein one of the plurality of tool attachments is a wood shear attachment.

13. The multiple tool attachment system according to claim 12, wherein the wood shear attachment includes a blade insert and an anvil insert, the blade insert cooperates with the anvil insert.

14. The multiple tool attachment system according to claim 13, wherein:
the blade insert includes a blade and a piercing tip,
the anvil insert includes a pair of spaced apart tines, and
the pair of spaced apart tines are configured to receive the blade therebetween.

15. The multiple tool attachment system according to claim 13, wherein:
the tool carrier includes a recess, and
the blade insert includes a projection configured to engage the recess.

16. The multiple tool attachment system according to claim 1, wherein one of the plurality of tool attachments is an iron/rail cracker attachment.

17. The multiple tool attachment system according to claim 16, wherein the iron/rail cracker attachment includes a single cracker insert.

18. The multiple tool attachment system according to claim 1, wherein the iron/rail cracker attachment includes a double cracker insert.

19. The multiple tool attachment system according to claim 1, wherein one of the plurality of tool attachments is a grapple attachment.

20. The multiple tool attachment system according to claim 19, wherein the grapple attachment includes a pair of grapple inserts.

21. The multiple tool attachment system according to claim 20, wherein the pair of grapple inserts each include a plurality of tines.

22. The multiple tool attachment system according to claim 21, wherein the plurality of tines of a first grapple insert are offset from the plurality of tines of a second grapple insert.

23. The multiple tool attachment system according to claim 21, wherein the plurality of tines of a first grapple insert are aligned with the plurality of tines of a second grapple insert.

24. The multiple tool attachment system according to claim 20, wherein each of the pair of grapple inserts includes a central cavity.

25. The multiple tool attachment system according to claim 24, wherein each of the pair of grapple inserts further includes:
a retaining bar;
a retaining pin including a slot configured to receive the retaining bar; and
an opening on an end of the insert configured to receive the retaining bar.

26. The multiple tool attachment system according to claim 1, further including a plurality of fasteners,
wherein each tool carrier includes a mounting surface and at least one fastener hole;
wherein one of the plurality of tool attachments engages each mounting surface;
wherein the plurality of fasteners connect the one of the plurality of tool attachments to the tool carrier via the at least one fastener hole of each tool carrier; and
wherein the plurality of fasteners includes a plurality of bolts and a plurality of nuts engageable with the bolts.

27. The multiple tool attachment system according to claim 1, further including a pair of wear plates adjacent to each of the pair of jaws and distal the body.

28. The multiple tool attachment system according to claim 1, wherein each jaw includes at least one cutting insert.

29. The multiple tool attachment system according to claim 28, further including at least one wear plate adjacent to at least one cutting insert and distal the body.

30. The multiple tool attachment system according to claim 28, wherein at least one jaw includes two cutting inserts.

31. The multiple tool attachment system according to claim 30, wherein the two cutting inserts form an apex.

32. A multiple tool attachment system for demolition equipment comprising:
a pair of jaws configured to couple to the demolition equipment, at least one of the jaws being pivotable;
a plurality of tool attachments selectively attachable to each of the pair of jaws for forming distinct tool units; and
a tool carrier on each of the jaws and extending to the end of each jaw, wherein each tool carrier includes a mounting surface adapted to receive one of a plurality of tool attachments that is secured to the mounting surface through at least one pair of opposing attachment lugs which engage and are secured within a matching opposing pair of attachment lug retention slots.

33. The multiple tool attachment system according to claim 32, wherein the plurality of tool attachments includes one or more attachments from the group of attachments comprising a cracker attachment, a pulverizing attachment, a wood shear attachment, an iron/rail cracker attachment, and a grapple attachment.

34. A multiple tool attachment system for demolition equipment comprising:
a pair of jaws configured to couple to the demolition equipment, at least one of the jaws being pivotable, and each jaw having a tool cater extending to the end of each jaw;

a plurality of tool attachments selectively attachable to each tool cater of the pair of jaws for forming distinct tool units; and a plurality of fasteners;

wherein each tool cater includes a mounting surface adapted to receive one of the plurality of tool attachments, wherein one of the plurality of the tool attachment is secured to the mounting surface through at least one pair of opposing attachment lugs which engage and are secured within a matching opposing pair of attachment lug retention slots;

wherein the at least one pair of opposing attachment lug retention slots are separated by a central portion and a fastener hole extends through the central portion to connect each pair of opposing attachment lug retention slots; and wherein each pair of opposing attachment lugs has a fastener hole extending therethrough such that when each pair of opposing attachment lugs is engaged within the respective pair of attachment lug retention slots, a fastener may extend through the fastener hole to secure the attachment lugs within the attachment lug retention slots thereby securing one of the plurality of the tool attachment to the tool carrier.

35. A multiple tool attachment system for demolition equipment comprising:

an adapter for coupling the system to existing demolition equipment;

a body coupled to the adapter;

a pair of jaws coupled to the body, at least one of the jaws being pivotable, and each jaw having a tool carrier extending to the end of each jaw; and a plurality of tool attachments selectively attachable to each tool carrier for forming distinct tool units;

wherein one of the plurality of tool attachments is a grapple attachment which includes a pair of grapple inserts and wherein each of the pair of grapple inserts includes a central cavity; and wherein each of the pair of grapple inserts further includes:

a retaining bar;

a retaining pin including a slot configured to receive the retaining bar; and an opening on an end of the insert configured to receive the retaining bar.

* * * * *

UNITED STATES PATENT AND TRADEMARK OFFICE
CERTIFICATE OF CORRECTION

PATENT NO. : 7,354,010 B2  Page 1 of 1
APPLICATION NO. : 10/533862
DATED : April 8, 2008
INVENTOR(S) : Ramun et al.

It is certified that error appears in the above-identified patent and that said Letters Patent is hereby corrected as shown below:

Title of the Patent, insert the following:

Item                   -- Related U.S. Application Data
(60)    Provisional application No. 60/425,394, filed on November 12, 2002 --

Column 8, Line 35, Claim 29, "one cuffing insert" should read -- one cutting insert --

Column 8, Line 66, Claim 34, "tool cater" should read -- tool carrier --

Column 9, Line 2 and Line 5, Claim 34, "tool cater" should read -- tool carrier --

Signed and Sealed this

Seventh Day of October, 2008

JON W. DUDAS
*Director of the United States Patent and Trademark Office*